(12) United States Patent
Deckert et al.

(10) Patent No.: US 8,997,086 B2
(45) Date of Patent: Mar. 31, 2015

(54) FIX DELIVERY SYSTEM

(71) Applicant: International Business Machines Corporation, Armonk, NY (US)

(72) Inventors: Marlin R. Deckert, San Jose, CA (US); King Shing K. Lui, Toronto (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/707,203

(22) Filed: Dec. 6, 2012

(65) Prior Publication Data

US 2013/0159989 A1    Jun. 20, 2013

(30) Foreign Application Priority Data

Dec. 20, 2011 (CA) .................................... 2763547

(51) Int. Cl.
*G06F 9/44* (2006.01)
*G06F 9/445* (2006.01)

(52) U.S. Cl.
CPC ... *G06F 8/65* (2013.01); *G06F 8/61* (2013.01)
USPC .......................................... 717/172; 717/177

(58) Field of Classification Search
CPC ..................................... G06F 8/61; G06F 8/65
USPC .................................................. 717/172, 177
See application file for complete search history.

(56) References Cited

U.S. PATENT DOCUMENTS

| | | | |
|---|---|---|---|
| 5,805,891 A | 9/1998 | Bizuneh et al. | |
| 7,191,364 B2 | 3/2007 | Hudson et al. | |
| 7,409,710 B1* | 8/2008 | Uchil et al. | 726/19 |
| 7,614,043 B2 | 11/2009 | Ognev et al. | |
| 7,617,423 B2 | 11/2009 | Patel et al. | |
| 7,774,147 B1 | 8/2010 | Manaev | |
| 8,271,402 B2* | 9/2012 | Fisher, Jr. | 706/12 |
| 8,332,765 B2* | 12/2012 | Ergan et al. | 715/764 |
| 8,621,278 B2* | 12/2013 | Petukhov et al. | 714/26 |

(Continued)

OTHER PUBLICATIONS

Diaz, R., "Automatic Software Dignostics [sic] and Resolution System", Disclosure No. IPCOM000011623D, Mar. 10, 2003, http://ip.com/IPCOM/000011623, Abstract, pp. 1-1.

(Continued)

*Primary Examiner* — Phillip H Nguyen
(74) *Attorney, Agent, or Firm* — Law Office of Jim Boice (57) ABSTRACT

A fix delivery system receives situation data representative of a problem, analyzes the received situation data to determine whether the problem associated with the situation data matches a known problem, and responsive to a determination that the problem associated with the situation data does not match a known problem, conducts problem determination to identify the problem. The fix delivery system further receives a developed cumulative fix for the identified problem, builds an installable cumulative fix for the identified problem using the situation data, and responsive to a determination that the installable cumulative fix meets predetermined requirements and the installable cumulative fix is a new installable cumulative fix, saves the new installable cumulative fix in a storage system and sends the new installable cumulative fix to a requester.

20 Claims, 5 Drawing Sheets

(56) References Cited

U.S. PATENT DOCUMENTS

| | | |
|---|---|---|
| 2004/0003387 A1 | 1/2004 | Ballard et al. |
| 2006/0015840 A1 | 1/2006 | Marvel et al. |
| 2006/0064685 A1 | 3/2006 | DeFolo |
| 2006/0123414 A1 | 6/2006 | Fors et al. |
| 2006/0265630 A1 | 11/2006 | Alberti et al. |
| 2008/0098382 A1* | 4/2008 | Declercq et al. ............... 717/170 |
| 2008/0148248 A1 | 6/2008 | Volkmer et al. |
| 2008/0172574 A1* | 7/2008 | Fisher ............................. 714/25 |
| 2008/0196021 A1 | 8/2008 | Clinton et al. |
| 2008/0209276 A1 | 8/2008 | Stubbs et al. |
| 2009/0254896 A1 | 10/2009 | Khan et al. |
| 2011/0258609 A1 | 10/2011 | Maczuba |
| 2013/0007527 A1* | 1/2013 | Petukhov et al. ............... 714/37 |

OTHER PUBLICATIONS

Anonymous, "A Method for Identifying the Relationship of Software Fix Package Information Across Repositories", Disclosure No. IPCOM000177496D, Dec. 15, 2008, http://ip.com/IPCOM/000177496, pp. 1-1.

Murphy, B., "Automating Software Failure Reporting", Queue Magazine—System Failures, vol. 2, Issue 8, Nov. 2004, ACM, Abstract, pp. 1-2.

Yuan, C., et al., "Automated Known Problem Diagnosis With Event Traces", ACM SIGOPS Operating Systems Review—Proceedings of the 2006 Eurosys Conference, vol. 40, No. 4, Oct. 2006, pp. 375-388.

International Application No. PCT/CA2012/050619—International Search Report Dated Dec. 18, 2012.

* cited by examiner

Fix delivery system 300

FIX DELIVERY SYSTEM

BACKGROUND

This disclosure relates generally to problem management in a data processing system and more specifically to a fix delivery system in the data processing system.

A service strategy for a typical software product has an indirect relationship with componentization of the software. For example, some software products can deliver a fix by completely replacing an entire component (such as a plugin), representative of a cumulative fix strategy, in which all required changes are encapsulated into a next version of the component. In another example, a typical product, such as an application server, uses a patch strategy to deliver an immediate fix to a customer by replacing specific parts of the component, for example a specific class file. The patch strategy typically results in a number of patches being applicable to a same artifact (for example, a particular .jar file) and accordingly introduces increased complexity in relationships among patches (including prerequisite, co-requisite, and exclusive relationship). As a result, multiple patches are often required to fix the customer problem.

A patch, which is packaged as a standalone atomic fix, is built to address a specific defect in the code. In many cases, a solution for a problem experienced by a customer typically requires a combination of multiple atomic fixes to address all symptoms of the problem.

A customer searching for a fix to the problem on the Internet may not be able to identify a complete solution (proper combination of atomic fixes) and accordingly calls a customer support service. A customer receiving an incomplete fix therefore has to call the customer support service multiple times until the complete solution is finally achieved through application of multiple atomic fixes. Multiple iterations of problem determination (PD) and customer calls are typically required to deliver the complete solution to the customer.

From a perspective of the customer, a need for multiple iterations of problem determination and customer calls may result in dissatisfaction with a given service process and unacceptable time to address the problem particularly with regard to mission critical applications.

From a software vendor perspective, more resources are required to help a customer to complete multiple iterations of problem determination to identify all root causes of the problem and to deliver a complete solution, which may consist of multiple atomic fixes required to address the problem.

SUMMARY

According to one embodiment, a computer-implemented process for a fix delivery system, receives situation data representative of a problem, analyzes the received situation data to determine whether the problem associated with the situation data matches a known problem and responsive to a determination that the problem associated with the situation data does not match a known problem, conducts problem determination to identify the problem. The computer-implemented process further receives a developed cumulative fix for the identified problem, builds an installable cumulative fix for the identified problem using the situation data and determines whether the installable cumulative fix meets predetermined requirements. Responsive to a determination that the installable cumulative fix meets predetermined requirements, the computer-implemented process further determines whether the installable cumulative fix is a new installable cumulative fix and responsive to a determination that the installable cumulative fix is a new installable cumulative fix, saves the installable cumulative fix in a storage system and sends the installable cumulative fix to a requester.

According to another embodiment, a computer program product for a fix delivery system comprises a computer recordable-type media containing computer executable program code stored thereon. The computer executable program code comprises computer executable program code for receiving situation data representative of a problem, computer executable program code for analyzing the received situation data to determine whether the problem associated with the situation data matches a known problem, computer executable program code responsive to a determination that the problem associated with the situation data does not match a known problem, conducting problem determination to identify the problem, computer executable program code for receiving a developed cumulative fix for the identified problem, computer executable program code for building an installable cumulative fix for the identified problem using the situation data, computer executable program code for determining whether the installable cumulative fix meets predetermined requirements, computer executable program code responsive to a determination that the installable cumulative fix meets predetermined requirements for determining whether the installable cumulative fix is a new installable cumulative fix and computer executable program code responsive to a determination that the installable cumulative fix is a new installable cumulative fix for saving the installable cumulative fix in a storage system and computer executable program code for sending the installable cumulative fix to a requester.

According to another embodiment, an apparatus for a fix delivery system comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive situation data representative of a problem, analyze the received situation data to determine whether the problem associated with the situation data matches a known problem and responsive to a determination that the problem associated with the situation data does not match a known problem, conduct problem determination to identify the problem. The processor unit further executes the computer executable program code to direct the apparatus to receive a developed cumulative fix for the identified problem, build an installable cumulative fix for the identified problem using the situation data and determine whether the installable cumulative fix meets predetermined requirements. The processor unit executes the computer executable program code responsive to a determination that the installable cumulative fix meets predetermined requirements, to direct the apparatus to further determine whether the installable cumulative fix is a new installable cumulative fix and responsive to a determination that the installable cumulative fix is a new installable cumulative fix, save the installable cumulative fix in a storage system and send the installable cumulative fix to a requester.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
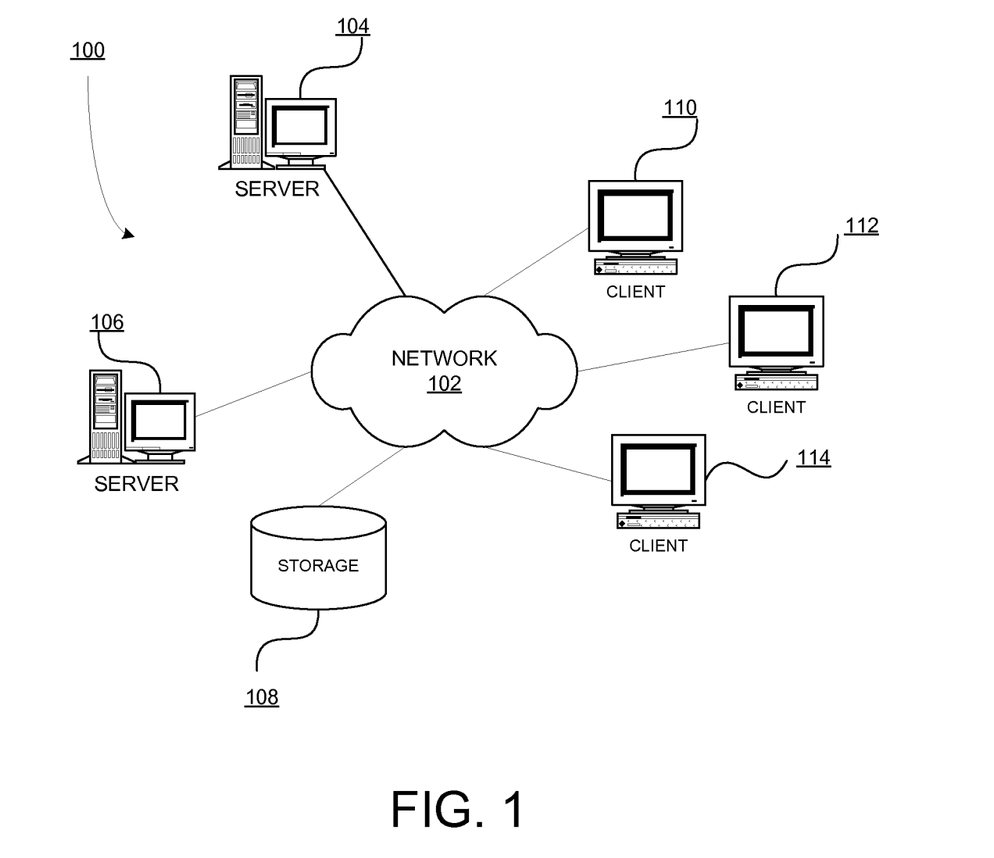
FIG. 1 is a block diagram of an exemplary network data processing system operable for various embodiments of the disclosure.
Figure 2:
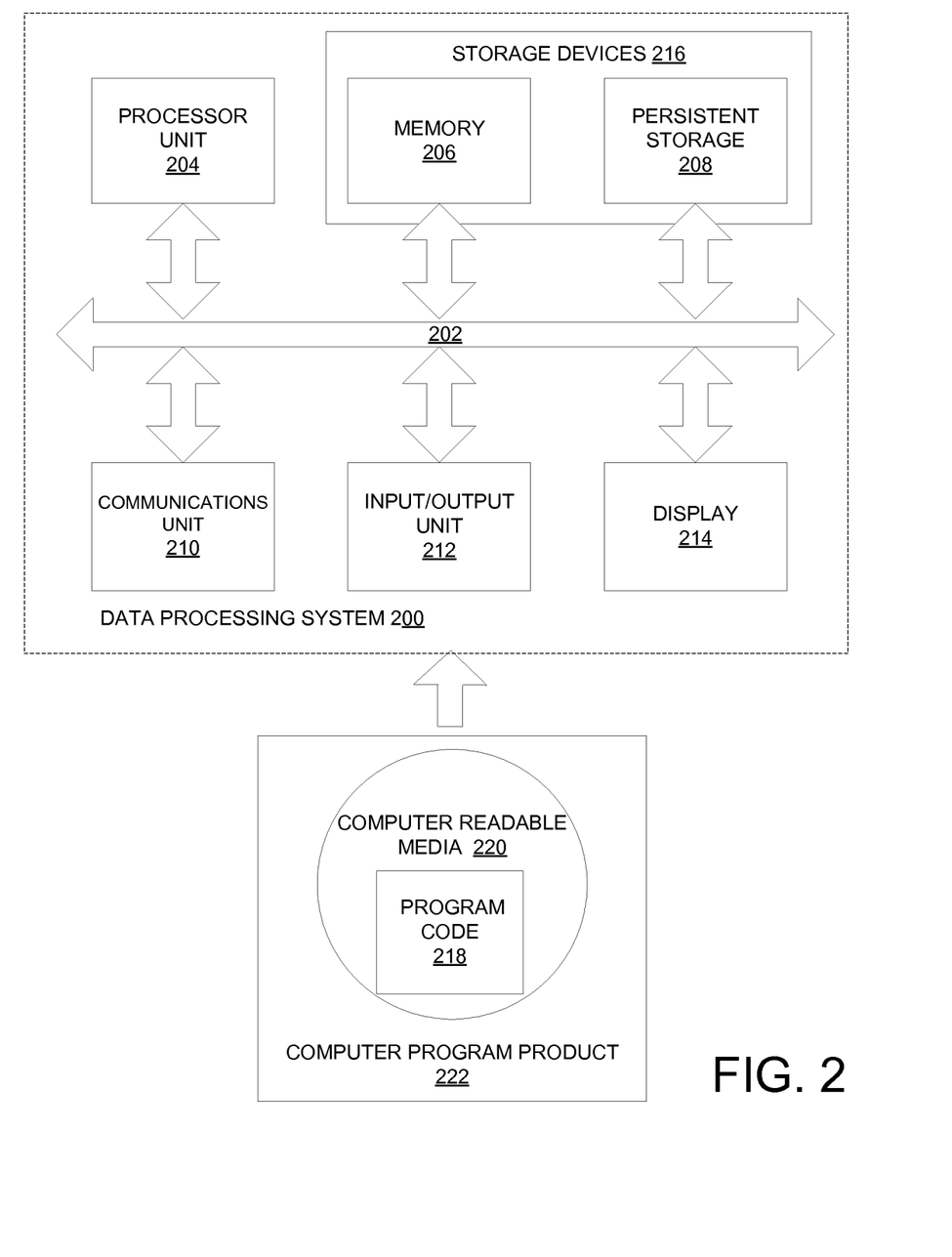
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Disclosed is a process to deliver a complete solution to the customer by identifying the dependencies between atomic fixes and programmatically building a solution to a customer problem by creating a single package that contains multiple atomic fixes. From a perspective of a software provider, use of an embodiment of the disclosed process can typically reduce resource requirements to resolve complex customer issues and minimize turnaround time thereby increasing customer satisfaction. From a perspective of a customer, use of an embodiment of the disclosed typically enables the customer to quickly acquire a solution to address respective business concerns and accordingly reduce the impact on a respective business.

Using data processing system 200 of FIG. 2 as an example, a computer-implemented process for a fix delivery system is presented. Processor unit 204 receives situation data representative of a problem using communications unit 210, input/output unit 212, or storage devices 216 analyzes the received situation data to determine whether the problem associated with the situation data matches a known problem and responsive to a determination that the problem associated with the situation data does not match a known problem, conducts problem determination to identify the problem. Processor unit 204 further receives a developed cumulative fix for the identified problem, builds an installable cumulative fix for the identified problem using the situation data and determines whether the installable cumulative fix meets predetermined requirements. Responsive to a determination that the installable cumulative fix meets predetermined requirements, processor unit 204 further determines whether the installable cumulative fix is a new installable cumulative fix and responsive to a determination that the installable cumulative fix is a new installable cumulative fix, saves the installable cumulative fix in a storage system, such as storage devices 216 and sends the installable cumulative fix to a requester, for example, using communications unit 210.

Figure 3:
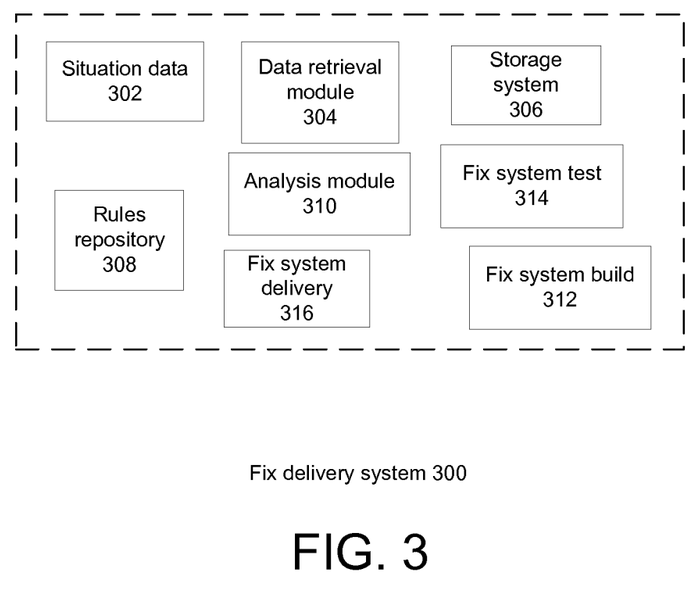
FIG. 3 is a block diagram of a fix delivery system operable for various embodiments of the disclosure.

With reference to FIG. 3 a block diagram of a fix delivery system operable for various embodiments of the disclosure is presented. Fix delivery system 300 is an example of an automated fix delivery system which analyzes a reported issue, identifies a set of atomic fixes addressing the reported issue, builds a cumulative fix out of the fixes in the set of atomic fixes, tests and validates the cumulative fix, and delivers the fix to the customer with minimal need for intervention by product support services.

Fix delivery system 300 leverages support of an underlying data processing system such as data processing system 200 of FIG. 2 or network data processing system 100 of FIG. 1.

Fix delivery system 300 consists of two logical systems providing a capability to identify, build and deliver fixes tailored to the resolution of a problem situation. In one embodiment, the logical systems may be maintained as separate systems interfacing with one another as needed. In an alternative embodiment, the logical systems may be implemented as a set of services contained within a single problem management system. One system of the logical systems comprises a rule based problem analysis system to identify a set of atomic fixes, and define relationships among atomic fixes in the set of atomic fixes. Another system in the pair of logical systems comprises a solution delivery system to build a cumulative fix using the atomic fixes in the set of atomic fixes.

The rule based problem analysis system of the logical systems comprises a number of components including situation data 302, data retrieval module 304, storage system 306, rules repository 308, and analysis module 310. The rule based problem analysis system programmatically analyzes customer system artifacts comprising situation data 302 (using a set of existing artifact analyzing techniques) and identifies a set of atomic fixes to resolve an identified issue or set of issues associated with a problem received. Situation data 302 comprises information including log files, configuration files, properties, characteristics, and event information representative of an environment, for example a customer system, in which a problem associated with a component of application software occurred. A component of a software application is a broad collection of entities including an application, a module within an application, a function in which a defect is encountered.

Data retrieval module 304 provides a capability to receive or retrieve artifacts representative of situation data 302 from a data processing system of the customer for problem determination. Data retrieval module 304 comprises a pluggable subsystem in which custom data retrieval modules can be added as needed for new products or new features of existing products. Data retrieval module plugins are tailored to specific implementations of data structures representative of specific product or component instances.

Data retrieval module 304 can retrieve information from a data processing system of a customer for problem determination using predetermined communication protocols for exchanging information with the customer system. For example, an agent of data retrieval module 304 may be implemented on a target system for the retrieving information of the target system and sending the retrieved information to the data retrieval module. In another example, data retrieval module 304 initiates a file transfer to retrieve data from the target system.

Rule repository 308 contains a set of rules used to identify known problems described using situation data 302 or other forms of information received through data retrieval module 304. The repository further contains rules specifying dependencies between fixes for the identified problems. Each rule in the repository has a recommended solution with unique problem identifier (ID).

Analysis module 310 provides a capability of supporting different pluggable analyzers per product type, and generating a problem analysis report using the received artifacts representative of situation data 302. Analysis module 310 provides a capability to evaluate a probability of a newly received problem matching a previous logged and recorded problem, for example, an exception or an error code generated by an application. As previously stated each rule of rules repository 308 has an associated recommended solution, for example, the solution can be an existing atomic fix with code modification, with a unique problem identifier.

Figure 4:
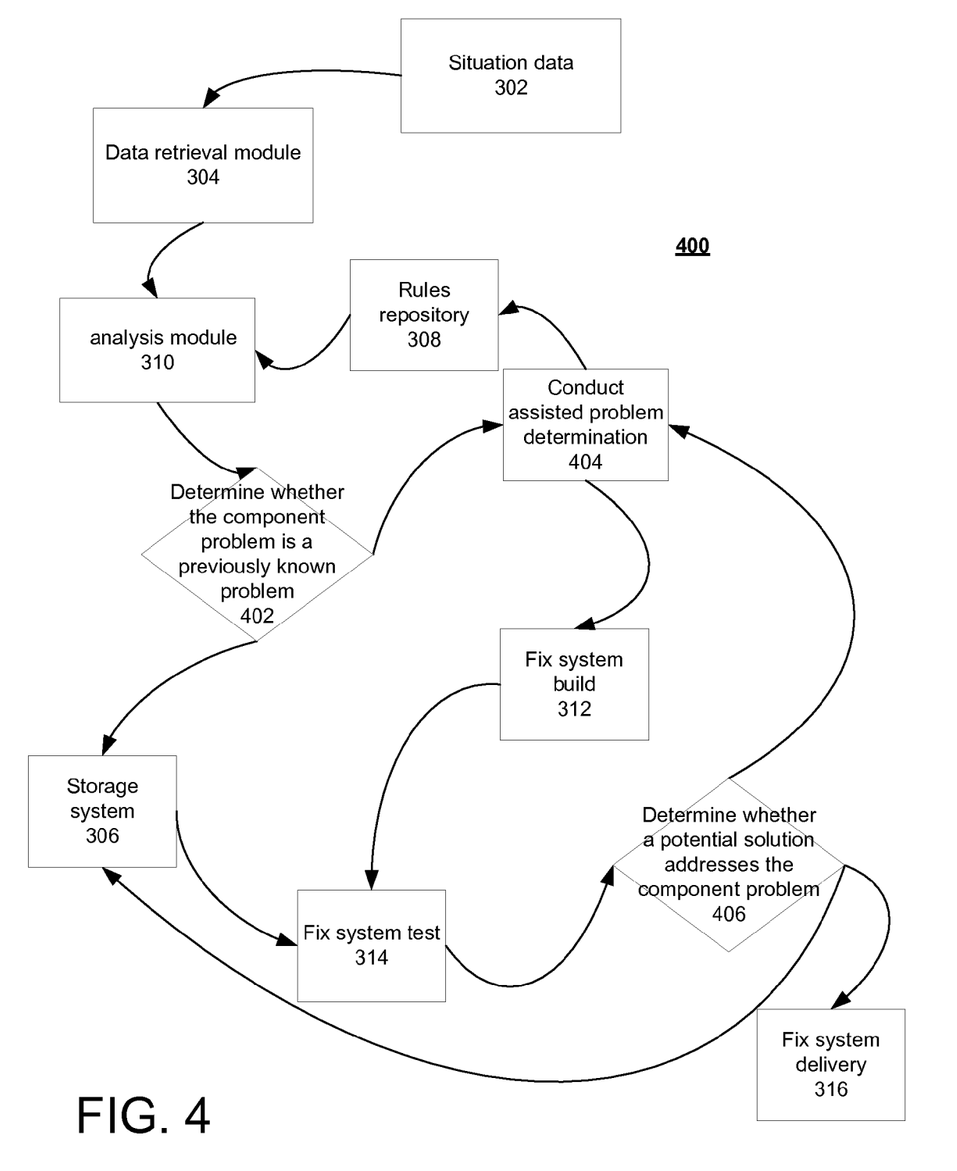
FIG. 4 is a block diagram of a logical data flow of the fix delivery system of FIG. 3 in accordance with various embodiments of the disclosure.

With reference to FIG. 4 a block diagram of a logical data flow of the fix delivery system of FIG. 3 operable for various embodiments of the disclosure is presented. Flow 400 is an example of a logical data flow within the logical systems of a rule based problem analysis system for identifying a set of atomic fixes, and defining relationships among atomic fixes in the set of atomic fixes and a solution delivery system for building a cumulative fix using the identified atomic fixes.

Situation data 302 is received by data retrieval module 304 of FIG. 3. Customer system artifacts comprising situation data 302 of FIG. 3 are created by a system or component of the system with a failing component or another system or component of the other system having access to the failing component on the system. The artifacts created include information useful in identification of the problem and associated probable existing solutions or development of new solutions.

Analysis module 310 of FIG. 3 evaluates the probability of matching any rule in the set of rules and provides a suggested respective problem identifier in a problem analysis report and then identifies a set of fixes to produce a recommended solution. When the recommended solution contains available atomic fixes analysis module 310 of FIG. 3 sends the request for building a cumulative fix to components of a logical system of the solution delivery system.

The rule based problem analysis system identifies the set of atomic fixes and forwards the set to a solution delivery system to build an installable cumulative fix. The installable cumulative fix typically addresses three problem types.

In one example an installable cumulative fix addresses a complex problem type. The unique rule associated with this complex problem contains information recording a set of atomic fixes, and the co-requisite relationship between the set of atomic fixes. When the complex problem is reported for a first time, a software support specialist typically performs problem determination to identify a root cause of the problem and a corresponding cumulative fix (as a set of atomic fixes) and adds the corresponding rules to the rules repository. Any later report of the same problem by a customer will be addressed by programmatically creating a cumulative fix using the existing information.

In another example an installable cumulative fix addresses only one unique independent problem. The atomic fix resolving this type of problem has a rule that specifies a pre-requisite relationship with a set of atomic fixes (for example, updating the same artifact). When a customer requests this specific atomic fix, all pre-requisite atomic fixes will also be shipped to the customer.

In another example an installable cumulative fix addresses different independent problems. The atomic fixes associated with the different independent problems are not related. Each independent problem along with an atomic fix is linked to a unique rule. The installable cumulative fix contains multiple atomic fixes, at least one per independent problem.

The logical system of the solution delivery system determines whether the component problem is a previously known problem using operation 402. The solution delivery system searches in storage system 306 of FIG. 3 for an existing installable cumulative fix containing proposed atomic fixes of the recommended solution.

When an existing installable cumulative fix does not exist (not found), operation 404 to conduct assisted problem determination is performed. Assisted problem determination may involve product development personnel to review previously obtained material. In an alternative applied logic may identify additional process options and information used to further analyze a problem instance. For example, when a review of a log file fails to specifically identify a problem cause, a next operation may include a review of a customer configuration file to determine whether the problem is related to a configuration specification value or option setting.

A request for an installable cumulative fix for the identified problem is forwarded to fix system build 312 of FIG. 3 to build an installable cumulative fix using atomic fixes from the set of atomic fixes identified in operation 404. The installable cumulative fix is generated from known atomic fixes, newly created atomic fixes or a combination thereof as needed. Newly created atomic fixes typically require addition of new rules to rules repository 308 of FIG. 3 to aid in future fix determination. The installable cumulative fix is built specifically for a specific customer situation as identified using the situation data.

The installable cumulative fix is then provided to fix test system 314 of FIG. 3 for testing in combination with information of situation data 302 of FIG. 3, for example, a customer configuration. For example, atomic fixes from the set of atomic fixes identified in operation 404 are previously used in creation of a installable cumulative fix for an instance supporting a specific platform, but not the same platform identified in a current problem, thereby necessitating a new installable cumulative fix to be generated. In another example, the identified problem is new and therefore a new installable cumulative fix is required. In another example, application options have changed to include uses of additional modules not identified in a previous installable cumulative fix, thereby necessitating a new installable cumulative fix.

The solution delivery system validates a testing result to determine whether a potential solution addresses the component problem in operation 406. When a determination is made that the test produces a satisfactory result the solution delivery system delivers the installable fixes to a requester using fix system delivery 316 of FIG. 3. The solution delivery system further saves the validated fixe(s) to storage system 306 of FIG. 3 for future use.

When a determination is made that the test does not produce a satisfactory result the solution delivery system iterates back through operation 404 to further use information and analysis to identify a probable cause of and resolution to the problem at hand. Assisted problem determination may include information comprising additional situation data derived through use of further analysis procedures as well as additional problem related information associated with a requesting system retrieved from the requesting system or received by data retrieval module from the requesting system.

Figure 5:
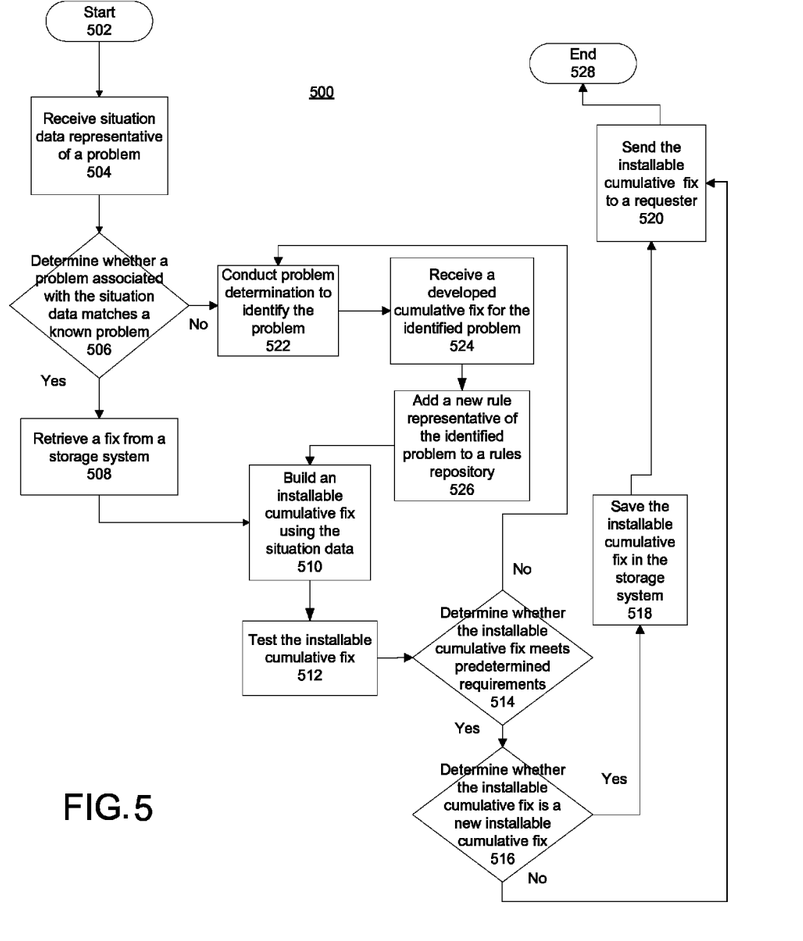
FIG. 5 is a flowchart of a process of a fix delivery system of FIG. 3 in accordance with various embodiments of the disclosure.

With reference to FIG. 5 a flowchart of a process of a fix delivery system of FIG. 3 operable for various embodiments of the disclosure is presented. Process 500 is an example of using fix delivery system 300 of FIG. 3 as a programmatic fix delivery system which analyzes a reported issue, identifies a set of atomic fixes addressing the reported issue, builds a installable cumulative fix using the atomic fixes in the set of atomic fixes, tests and validates the generated installable cumulative fix, and delivers the installable cumulative fix to a requesting customer without (or minimal) need for intervention by product support services.

Process 500 begins (step 502) and receives situation data as input (step 504). Situation data may be received in a request or associated with a request for corrective action. Typically a request informs the fix delivery system of a need to resolve a problem encountered by a portion of a user system for which support is provided. The fix delivery system may receive information as situation data from the requesting system or pull the information in response to the request. The fix delivery system may also request or retrieve additional information to aid in problem identification and resolution later in process 500 depending upon progress made.

Process 500 analyzes the received situation data to determine whether a problem associated with the received situation data matches a known problem (step 506). Problem analysis typically traverses a set of rules using a rule based analysis sub-process, which includes pattern identification, for example, a signature of a problem, or an error condition raised as well as a context in which the problem occurred. A rule repository identifies a list of atomic fixes for the identified problem. The fix can be comprised of content of a cumulative fix including a set of atomic fixes with co-requisite relationships addressing one complex problem, a single atomic fix addressing one unique independent problem, (however this atomic fix has a pre-requisite relationship with a further set of atomic fixes which are not necessarily addressing the instant unique independent problem), and a set of unrelated atomic fixes addressing different independent problems. The fix can also comprise a single atomic fix.

Situation analysis provides a collection of information representative of a problem instance sufficient to identify a problem. Responsive to a determination that a problem associated with the received situation data matches a known problem, process 500 retrieves a fix for the identified problem in a storage system using a unique problem identifier associated with a respective rule used in identifying the problem (step 508).

Process 500 builds an installable cumulative fix using the situation data and components of the retrieved fix obtained from within the storage system (step 510). Building the installable cumulative fix includes information contained within situation data to reflect a context of the system requesting the fix.

Process 500 tests the installable cumulative fix (step 512). The installable cumulative fix is tested in a context of the requesting system to validate the fix works in an environment in which the problem was encountered. Process 500 determines whether the installable cumulative fix meets predetermined requirements (step 514). The requirements are representative of criteria sufficient to establish resolution of the problem of the request in the context of the requester.

Responsive to a determination that the installable cumulative fix meets the predetermined requirements, process 500 determines whether the installable cumulative fix represents a new installable cumulative fix (step 516). Responsive to a determination that the installable cumulative fix represents a new installable cumulative fix, process 500 saves the built, tested and validated new installable cumulative fix in the storage system (step 518). The installable cumulative fix as previously stated represents one of a set of atomic fixes with co-requisite relationships addressing one complex problem, a single atomic fix addressing one unique independent problem, (the single atomic fix has a pre-requisite relationship with a set of atomic fixes not necessarily addressing the instant unique independent problem), and a set of unrelated atomic fixes addressing different independent problems. The new installable cumulative fix is stored as respective components and not stored as a single unit. Process 500 sends the tested and validated installable cumulative fix to the requester (step 520) and terminates thereafter (step 528).

Responsive to a determination that a problem associated with the received situation data does not match a known problem in step 506, process 500 conducts further problem determination to identify the problem (step 522). Problem determination includes further use of information associated with the problem and analysis to identify a probable cause of and resolution to the problem at hand. Assisted problem determination may include information comprising additional situation data derived through use of further analysis procedures, including complex rules, as well as additional problem related information associated with a requesting system retrieved from the requesting system or received by a data retrieval module from the requesting system.

Process 500 receives a developed cumulative fix for the identified problem to form components of a new cumulative fix (step 524). Development of a new cumulative fix includes in one example, collecting atomic fixes from among the set of atomic fixes, as needed to form a new installable cumulative fix to resolve the identified problem. In another example, a new atomic fix may be requested of a development service, which is then made available in the set of atomic fixes for subsequent use.

Process 500 adds a new rule representative of the identified problem to a rules repository (step 526). The new rule is a result of further problem determination analysis performed to identify the previously unmatched problem.

Process 500 builds an installable cumulative fix using the situation data and components of a new installable cumulative fix (step 510). Building the installable cumulative fix includes information contained within situation data to reflect a context of the system requesting the fix. Process 500 tests the installable cumulative fix in step 512 as before.

Responsive to a determination that the installable cumulative fix does not meet the predetermined requirements in step 514, process 500 loops back to perform step 522 as before. Responsive to a determination that the installable cumulative fix does not represent a new installable cumulative fix, process 500, does not save the installable cumulative fix, rather process 500 skips step 518 and sends the tested and validated installable cumulative fix to the requester as in the previously described step 520, terminating thereafter.

Thus is presented in an illustrative embodiment a computer-implemented process for a fix delivery system receives situation data representative of a problem, analyzes the received situation data to determine whether the problem associated with the situation data matches a known problem and responsive to a determination that the problem associated with the situation data does not match a known problem, conducts problem determination to identify the problem. The computer-implemented process further receives a developed cumulative fix for the identified problem, builds an installable cumulative fix for the identified problem using the situation data and responsive to a determination that the installable cumulative fix meets predetermined requirements and the installable cumulative fix is a new installable cumulative fix, saves the installable cumulative fix in a storage system and sends the installable cumulative fix to a requester.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A processor-implemented method for implementing a fix delivery system, the processor-implemented method comprising:
    receiving, by a processor, a situation data representative of a problem;
    analyzing, by the processor, a received situation data to determine whether a problem associated with the situation data matches a known problem by:
        analyzing the received situation data by traversing a set of rules using a rule based analysis sub-process;
    responsive to a determination that the problem associated with the situation data does not match the known problem, conducting a problem determination to identify the problem;
    receiving a developed cumulative fix for an identified problem, wherein the developed cumulative fix comprises multiple fixes from a set of atomic fixes;
    building an installable cumulative fix for the identified problem using the situation data, wherein the installable cumulative fix is derived from the atomic fixes in the developed cumulative fix;
    determining whether the installable cumulative fix meets predetermined requirements;
    responsive to a determination that the installable cumulative fix meets predetermined requirements, determining whether the installable cumulative fix is a new installable cumulative fix;
    responsive to a determination that the installable cumulative fix is a new installable cumulative fix, saving the installable cumulative fix in a storage system; and
    sending the installable cumulative fix to a requester.

2. The processor-implemented method of claim 1, wherein receiving situation data representative of a problem further comprises:
    retrieving, by a data retrieval module, artifacts representative of a problem from a data processing system for identifying the problem, wherein the data retrieval module comprises a pluggable subsystem that provides a capability in which custom data retrieval modules are added as needed for new products and new features of existing products, and wherein the data retrieval module comprises data retrieval module plugins that are tailored to a specific implementation of data structures representative of a specific product and component instance.

3. The processor-implemented method of claim 1, wherein the rule based analysis sub-process includes pattern identification, wherein an identified pattern comprises a signature of a problem, an error condition raised by the problem, and a context in which the problem occurred, and wherein the processor-implemented method further comprises:
    performing a situation analysis on the problem, wherein the situation analysis analyzes a collection of information representative of a problem instance in order to identify the problem and each rule in the set of rules that related to a specific problem; and
    comparing an identified problem with a set of known problems in a storage system.

4. The processor-implemented method of claim 1, wherein receiving a developed cumulative fix for the identified problem further comprises:
    collecting atomic fixes, from among a set of atomic fixes, in accordance with the identified problem and situation data to form the installable cumulative fix to resolve the identified problem;
    requesting a new atomic fix from a development service, in accordance with the identified problem and situation data; and
    in response to receiving the new atomic fix, saving the new atomic fix in the set of atomic fixes for subsequent use.

5. The processor-implemented method of claim 1, wherein building the installable cumulative fix for the identified problem using the situation data further comprises:
    using information contained within the situation data to describe a context of the system requesting the fix; and
    tailoring the installable cumulative fix to a specific implementation of data structures representative of a specific product and component instance of a requesting system.

6. The processor-implemented method of claim 1, wherein determining whether the installable cumulative fix meets predetermined requirements further comprises:
    testing the installable cumulative fix using information contained within the situation data to describe a context of the system requesting a fix to ensure the installable cumulative fix resolves the problem.

7. The processor-implemented method of claim 1, wherein responsive to a determination that the installable cumulative fix meets predetermined requirements, determining whether the installable cumulative fix is a new installable cumulative fix further comprises:
    responsive to a determination that the installable cumulative fix is not a new installable cumulative fix, sending the installable cumulative fix to a requester.

8. A computer program product for implementing a fix delivery system, the computer program product comprising a non-transitory computer readable storage medium having program code embodied therewith, the program code readable and executable by a processor to:
    receive, by a processor, a situation data representative of a problem;
    analyze, by the processor, a received situation data to determine whether a problem associated with the situation data matches a known problem by:
        analyzing the received situation data by traversing a set of rules using a rule based analysis sub-process;
    responsive to a determination that the problem associated with the situation data does not match the known problem, conduct a problem determination to identify the problem;
    receive a developed cumulative fix for an identified problem, wherein the developed cumulative fix comprises multiple fixes from a set of atomic fixes;
    build an installable cumulative fix for the identified problem using the situation data, wherein the installable cumulative fix is derived from the atomic fixes in the developed cumulative fix;
    determine whether the installable cumulative fix meets predetermined requirements;
    responsive to a determination that the installable cumulative fix meets predetermined requirements, determine whether the installable cumulative fix is a new installable cumulative fix;
    responsive to a determination that the installable cumulative fix is a new installable cumulative fix, save the installable cumulative fix in a storage system; and
    send the installable cumulative fix to a requester.

9. The computer program product of claim 8, wherein the program code is further readable and executable by the processor to:
    retrieve, by a data retrieval module, artifacts representative of a problem from a data processing system for identifying the problem, wherein the data retrieval module comprises a pluggable subsystem that provides a capability in which custom data retrieval modules are added as needed for new products and new features of existing products, and wherein the data retrieval module comprises data retrieval module plugins that are tailored to a specific implementation of data structures representative of a specific product and component instance.

10. The computer program product of claim 8, wherein the rule based analysis sub-process includes pattern identification, wherein an identified pattern comprises a signature of a problem, an error condition raised by the problem, and a context in which the problem occurred, and wherein the program code is further readable and executable by the processor to:
    perform a situation analysis on the problem, wherein the situation analysis analyzes a collection of information representative of a problem instance in order to identify the problem and each rule in the set of rules that related to a specific problem; and
    compare an identified problem with a set of known problems in a storage system.

11. The computer program product of claim 8, wherein the program code is further readable and executable by the processor to:
    collect atomic fixes, from among a set of atomic fixes, in accordance with the identified problem and situation data to form the installable cumulative fix to resolve the identified problem;
    request a new atomic fix from a development service, in accordance with the identified problem and situation data; and
    in response to receiving the new atomic fix, save the new atomic fix in the set of atomic fixes for subsequent use.

12. The computer program product of claim 8, wherein the program code is further readable and executable by the processor to:
    use information contained within the situation data to describe a context of the system requesting the fix; and
    tailor the installable cumulative fix to a specific implementation of data structures representative of a specific product and component instance of a requesting system.

13. The computer program product of claim 8, wherein the program code is further readable and executable by the processor to:
    test the installable cumulative fix using information contained within the situation data to describe a context of the system requesting a fix to ensure the installable cumulative fix resolves the problem.

14. The computer program product of claim 8, wherein the program code is further readable and executable by the processor to:
    responsive to a determination that the installable cumulative fix is not a new installable cumulative fix, send the installable cumulative fix to a requester.

15. An apparatus for implementing a fix delivery system, the apparatus comprising:
    a communications fabric;
    a memory connected to the communications fabric, wherein the memory contains computer executable program code;
    a communications unit connected to the communications fabric;
    an input/output unit connected to the communications fabric;
    a display connected to the communications fabric; and
    a processor unit connected to the communications fabric, wherein the processor unit executes the computer executable program code to direct the apparatus to:
    receive, by a processor, a situation data representative of a problem;
    analyze, by the processor, a received situation data to determine whether a problem associated with the situation data matches a known problem by:
        analyzing the received situation data by traversing a set of rules using a rule based analysis sub-process;
    responsive to a determination that the problem associated with the situation data does not match the known problem, conduct a problem determination to identify the problem;
    receive a developed cumulative fix for an identified problem, wherein the developed cumulative fix comprises multiple fixes from a set of atomic fixes;
    build an installable cumulative fix for the identified problem using the situation data, wherein the installable cumulative fix is derived from the atomic fixes in the developed cumulative fix;

determine whether the installable cumulative fix meets predetermined requirements;

responsive to a determination that the installable cumulative fix meets predetermined requirements, determine whether the installable cumulative fix is a new installable cumulative fix;

responsive to a determination that the installable cumulative fix is a new installable cumulative fix, save the installable cumulative fix in a storage system; and send the installable cumulative fix to a requester.

16. The apparatus of claim 15, wherein the processor unit executes the computer executable program code to receive situation data representative of a problem to further direct the apparatus to:

retrieve, by a data retrieval module, artifacts representative of a problem from a data processing system for identifying the problem, wherein the data retrieval module comprises a pluggable subsystem that provides a capability in which custom data retrieval modules are added as needed for new products and new features of existing products, and wherein the data retrieval module comprises data retrieval module plugins that are tailored to a specific implementation of data structures representative of a specific product and component instance.

17. The apparatus of claim 15, wherein the rule based analysis sub-process includes pattern identification, wherein an identified pattern comprises a signature of a problem, an error condition raised by the problem, and a context in which the problem occurred, and wherein the processor unit executes the computer executable program code to further direct the apparatus to:

perform a situation analysis on the problem, wherein the situation analysis analyzes a collection of information representative of a problem instance in order to identify the problem and each rule in the set of rules that related to a specific problem; and compare an identified problem with a set of known problems in a storage system.

18. The apparatus of claim 15, wherein the processor unit executes the computer executable program code to receive a developed cumulative fix for the identified problem to further direct the apparatus to:

collect atomic fixes, from among a set of atomic fixes, in accordance with the identified problem and situation data to form the installable cumulative fix to resolve the identified problem;

request a new atomic fix from a development service, in accordance with the identified problem and situation data; and in response to receiving the new atomic fix, save the new atomic fix in the set of atomic fixes for subsequent use.

19. The apparatus of claim 15, wherein the processor unit executes the computer executable program code to build an installable cumulative fix for the identified problem using the situation data to further direct the apparatus to:

use information contained within the situation data to describe a context of the system requesting the fix; and tailor the installable cumulative fix to a specific implementation of data structures representative of a specific product and component instance of a requesting system.

20. The apparatus of claim 15, wherein the processor unit executes the computer executable program code to determine whether the installable cumulative fix meets predetermined requirements to further direct the apparatus to:

test the installable cumulative fix using information contained within the situation data to describe a context of the system requesting a fix to ensure the installable cumulative fix resolves the problem.

* * * * *